Nov. 8, 1955 G. M. CRESSON 2,723,302
MOUNTING PLATE INSULATORS AND ASSEMBLIES
Filed Aug. 20, 1951
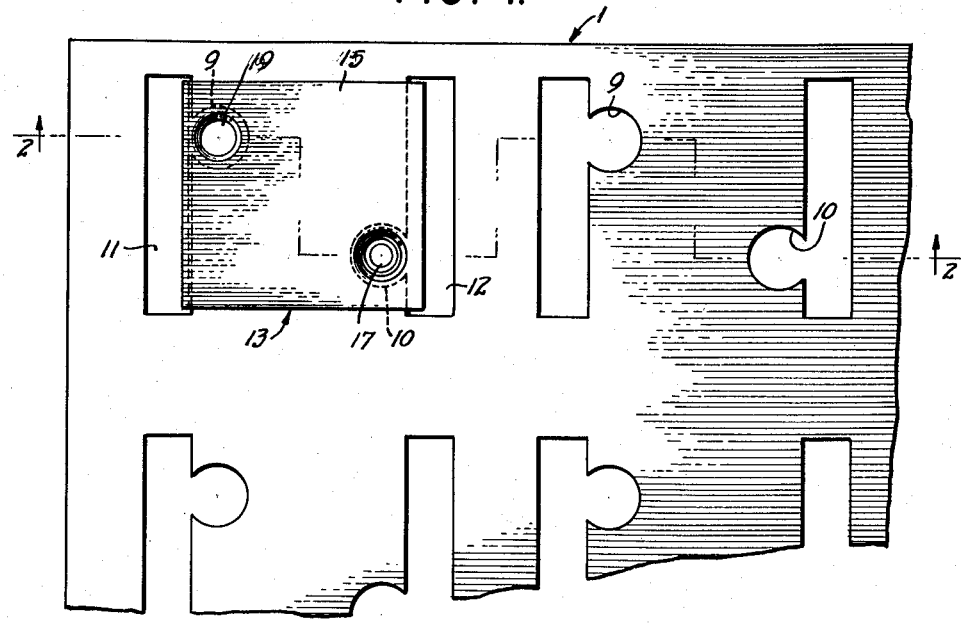
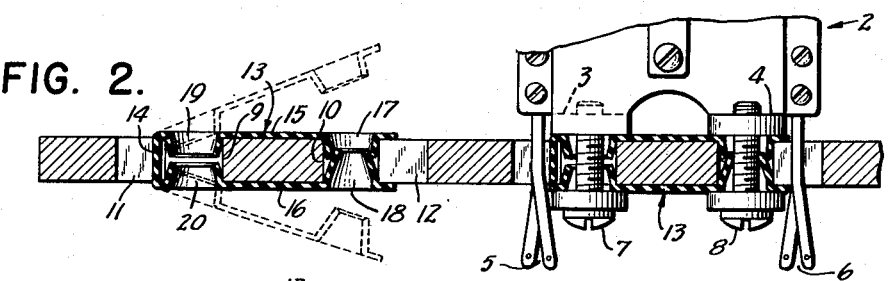
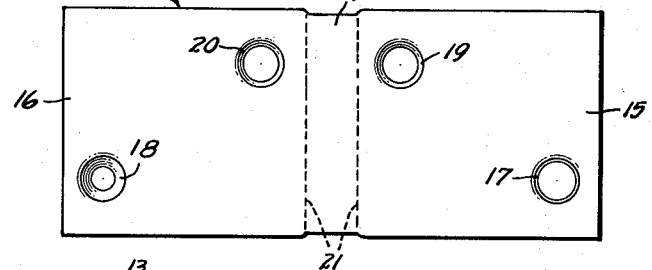
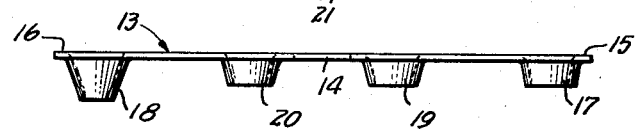
Inventor
G. M. CRESSON
Philip M. Bolton
Attorney

United States Patent Office 2,723,302
Patented Nov. 8, 1955

2,723,302

MOUNTING PLATE INSULATORS AND ASSEMBLIES

George M. Cresson, Lynbrook, N. Y., assignor to International Standard Electric Corporation, New York, N. Y., a corporation of Delaware Application August 20, 1951, Serial No. 242,691

13 Claims. (Cl. 174—138)

This invention relates to insulators for use in mounting electrical components on a metallic plate, to the mounting plate assemblies, and to the method of making these.

In assembling electrical components on a metallic plate, insulators are used to prevent leakage currents between the metallic frames of the electrical components, or the mounting legs thereof, and the plate on which they are mounted. It is frequently necessary to mount large numbers of electrical components on such plates, such as for example in mounting relays on telephone exchange panels etc. In mounting such components on a plate it has been customary to insert at least one or two screws through a hole in the plate and engage a corresponding threaded member in the frame or mounting legs of the electrical components. To insulate the screw head and the electrical components from the metallic plate, use is made of an insulating sleeve and two washers for each screw, the insulating sleeve being passed through the opening in said plate to insulate the shank of the screw, one washer being disposed under the head of the screw, and the other insulating washer being disposed under the leg of the electrical component. Thus for each screw there are three insulators and usually, taking relays for example, there are at least two screws, making a total of six insulating parts to be held and manipulated in mounting each of these components. It can be readily seen that this involves a great deal of work and wastage of time. Furthermore where the number of relays to be mounted is large, this time becomes a substantial factor in the cost of such assembly.

An object of the present invention is the provision of insulators for use in mounting electrical components which insulators may be easily temporarily positioned on a mounting plate. These insulators do not have to be held in place manually or by other temporary means prior to being permanently attached and additionally they eliminate to a considerable extent or altogether the necessity for manipulating or holding them while permanently fastening them by the usual screw or other fastening means.

In accordance with one feature of the invention such insulators consist of an insulating portion to be arranged against a face of the metal plate and an insulation tubulation extending from said portion, which tubulation is to be inserted into the hole in said metal plate. A pair of such insulators are used together, with the tubulations thereof inserted into the hole from opposite sides of the plate. The opposite tubulations are formed so that when pressed together they make frictional engagement with each other. For this purpose the tubulations may be tapered and one may be designed to telescope with, or slip over, the other and frictionally engage it with a tight fit.

Another object of the present invention is the provision of such insulators, a single pair of which may be used for providing insulation around a plurality of mounting holes in a metallic plate.

In accordance with this feature of the invention the portion of the insulator adapted to be arranged against the face of the metal plate may be in the form of an arm having a plurality of tubulations extending therefrom. A pair of such insulators are used for a plurality of holes with the tubulations thereof inserted from opposite sides of the metal mounting plates. At least one pair of opposite tubulations make frictional engagement with each other to make the entire insulator assembly self-retaining until permanently fastened by screw means or otherwise.

In accordance with another feature of the present invention such retention of the tubulations is provided for by forming such tubulations so that they engage the sides of the openings instead of, or in addition to, the frictional engagement of opposite tubulations with each other.

In accordance with still another feature of the present invention an integral U-shaped insulator is provided from whose opposite arms tubulations extend towards each other, the arms adapted to be arranged against the opposite faces of the metal mounting plate while the tubulations extend from these faces into the opening or openings.

In accordance with an aspect of this last feature the insulator is retained in place by the resiliency of the arms instead of, or in addition to, either, or both, of the forms of frictional engagements previously mentioned.

The above-mentioned and other features and objects of this invention and the manner of obtaining them will become more apparent and the invention itself will be best understood, by reference to the following description of an embodiment of the invention in conjunction with the accompanying drawings, wherein:

Fig. 1 is a plan view of a metal mounting plate adapted to be used for mounting relays, showing an insulator in place on said plate;

Fig. 2 is a sectional side view taken substantially along the line 2—2 of Fig. 1, with the addition of a complete relay mounting assembly showing the insulator;

Fig. 3 is a plan view of a blank with the tubulations formed therein showing a step in the method of making one form of insulator according to the present invention;

And Fig. 4 is an elevational view of the blank of Fig. 3.

Referring now to Figs. 1 and 2, a metallic plate 1 is shown which is stamped out for mounting thereon a telephone relay of a type having two legs 3 and 4 and two spaced sets of circuit terminals 5 and 6 which are to pass through suitable apertures in the plate, to enable connections to be made thereto on the side opposite the side on which the relay is mounted. The legs 3 and 4 are provided with internally threaded openings into which screws 7 and 8 are screwed after being passed through suitable openings 9 and 10 in plate 1. The terminals or terminating extensions of springs 5 and 6 similarly are passed through elongated apertures 11 and 12 in plate 1. The mounting openings 9 and 10 may be made separate from the elongated rectangular apertures or slots 11 and 12 or may be joined therewith as shown in Fig. 1.

In order to insulate the screws 7 and 8 and the legs 3 and 4 from the metallic plate 1 an insulator 13 is provided. Since a plurality of relays are to be mounted on mounting plate 1 the pattern of slots and apertures 9–12 for a single relay is repeated the desired number of times on mounting plate 1, and similarly a plurality of insulators 13, one for each relay is provided. The construction of insulator 13 can be best seen by examining the insulator 13 on the right side of Fig. 2 and Figs. 3 and 4.

Seen in cross-section as in Fig. 2 the insulator 13 is U-shaped and has a bridge portion 14 connecting to arms 15 and 16 which extend from opposite ends of the bridge portion in substantially parallel relation and in the same general direction the bridge being located within the aperture 11 and the arms extending along opposite faces of the mounting plate 1. Towards the end of arms 15 a tubulation 17 is formed, tapering and extending in the direction of arm 16, the tubulation 17 being adapted to be inserted in the opening 10, the sides of the tubulation making frictional engagement with the wall of plate 1 adjacent said opening. A similar tubulation 18 is provided in arm 16 the tubulation 18 tapering so that it is somewhat smaller than tubulation 17 and fits tightly into tubulation 17 and frictionally engages the inner walls thereof. A similar pair of tubulations 19 and 20 are provided nearer the bridge portion 14, adapted to fit into the openings 9 and being frictionally engaged by the walls of said opening. However, in order to make it easier to insert the insulator 13 in position over the plate the tubulations 19 may be somewhat shorter and may not make frictional engagements with each other. Both tubulations 19 and 20 may be of the same size and diameter.

It will be seen that the insulator 13 tends to remain in position after it has been placed on the plate due to the frictional engagements of the tubulations with the walls of the openings as well as the frictional engagement between tubulations 17 and 18. In addition the arms 15 and 16 are somewhat resilient, so that the resiliency of the arms themselves, independent of the frictional engagements heretofore mentioned, would be sufficient to hold the insulator 13 in place prior to mounting of the relay or component.

The insulator 13 may be made out of a sheet of any suitable insulating material such as for example vulcanized fiber or compressed paper or the like, which has been suitably treated, or if desired may be formed or moulded from a plastic such as that known as nylon. A blank such as shown in Fig. 3 may be stamped out of the main sheet, the blank being substantially rectangular in form. The tubulations 17, 18, 19 and 20 may be pressed out of the vulcanized sheet or extruded therefrom at the same time the blank is stamped out, or the tubulations may be formed in a separate operation. The preferred method may involve the use of heat. It will be noticed that the tubulations are symmetrically disposed on the sheet; that is 19 and 20 have symmetrical positions with respect to the center of the sheet which is to be bent to form the bridge portion 14. Likewise tubulations 17 and 18 are preferably symmetrically disposed with respect to the bridge portion 14. It will be seen that the nearer set of tubulations to the bridge 14, 19 and 20, are laterally staggered with respect to tubulations 17 and 18, so that upon bending the blank into a U-shape, the tubulations fit into the corresponding staggered openings 9 and 10. To facilitate the bending operation, the edges of the bridge portion may be scored as shown at 21, and the actual bending operation may be performed with the use of heat. The material chosen has sufficient resiliency so that after the insulator thus formed is inserted into the plate via aperture 11, the arms being spread for this insertion, they then will spring together. A slight additional pressure of the fingers may be required to provide the frictional engagements heretofore mentioned. The material is preferably readily deformable.

While I have described a preferred form of my invention it will be apparent that it might take other forms. For example, the two arms 14 and 15 could be separate or still further the portions bearing against the opposite faces of the metal mounting plate need not be arms but each tubulation could have a flange portion which bears against the face of the plate with a pair of such insulators provided for each hole and being temporarily retained in place by frictional engagement with each other or the opening prior to being permanently fastened. Likewise the pattern of openings and corresponding tubulations could be widely varied.

Furthermore while I have referred to the mounting plate 1 as being a metal plate it will likewise be apparent that it could be a non-metallic plate whose insulating or dielectric properties are insufficient to provide the insulation required so that additional insulating means such as any of the forms of insulators herein described may be used in addition thereto.

While I have described above the principle of my invention in connection with specific apparatus, it is to be clearly understood that this description is made only by way of example and not as a limitation to the scope of my invention.

What is claimed is:

1. An insulator for use in mounting electrical components, comprising an integral insulating member, U-shaped in cross-section, having a bridge portion and two spaced arms extending substantially parallel to each other in the same direction from said bridge portion, a tubulation in each of said arms in corresponding positions thereon, said tubulations extending inwardly towards each other, said tubulations being adapted to be inserted in openings in a mounting plate.

2. An insulator according to claim 1 wherein said two spaced arms extend substantially parallel to each other in the same direction, said insulating member being of a somewhat resilient material so that the arms thereof tend to reassume the parallel relationship thereof upon being displaced therefrom.

3. An insulator according to claim 1 wherein at least one of said tubulations tapers partly fits into the corresponding tubulation of the other and make frictional engagement therewith.

4. An insulator according to claim 1 further including another pair of aligned tubulations, one in each arm the latter tubulations being closer to the bridge portion than the first mentioned tubulations.

5. An insulator according to claim 4 wherein the tubulations adjacent the bridge portion are staggered laterally with respect to the tubulations further removed from the bridge portion.

6. An insulator according to claim 4 wherein the tubulations nearer the bridge portion are shorter than one of the tubulations further removed from the bridge portion.

7. In an assembly for insulating mounted electrical components on a metallic plate, said plate having an opening therein for the passage of a fastening device through said opening, an integral insulating member U-shaped in cross section having a bridge portion at least as high as the thickness of said plate and two spaced arms extending from said bridge portion positioned on opposite sides of said plate, a tubulation connected in each of said arms in corresponding positions on said arms, the tubulations being insertable in said opening of the plate, said tubulations extending inwardly towards each other.

8. An assembly according to claim 7 wherein said tubulations are tapered and are adapted to frictionally engage the walls of said openings.

9. An assembly according to claim 8 wherein said arms are sufficiently resilient to maintain the insulating member in position before the insertion of the fastening means therein.

10. An assembly according to claim 8 wherein said plate is provided with an elongated aperture adjacent said opening, one arm of said integral insulating member being inserted through said slot.

11. An assembly according to claim 8 wherein said plate is provided with an elongated slot for the passage of connections from the electrical components therethrough, the bridge portion of said insulating member being positioned within said slot abutting a wall thereof.

12. In an assembly for insulatingly mounting electrical components on a mounting plate, said plate having a plurality of openings therein for the passage of a plurality of fastening devices through said openings to engage said electrical components, insulating means comprising a pair of insulating arms each lying against a separate one of the opposite faces of the plate and extending over at least a plurality of openings, a plurality of tubulations extending from each arm, each tubulation from one arm extending into a corresponding one of said openings, at least one tubulation of the other arm extending into an opening opposite a tubulation of the said one arm in frictional engagement therewith.

13. An assembly according to claim 1 wherein at least another tubulation of said one arm extends into an opening opposite a tubulation of said other arm but separated therefrom.

References Cited in the file of this patent

UNITED STATES PATENTS

| | | |
|---|---|---|
| 1,309,799 | George | July 15, 1919 |
| 1,453,118 | Apple | Apr. 24, 1923 |
| 2,160,160 | Morinsky et al. | May 30, 1939 |
| 2,327,054 | Mays | Aug. 17, 1943 |
| 2,328,708 | Cooke et al. | Sept. 7, 1943 |
| 2,547,866 | Hingelberg | Apr. 3, 1951 |
| 2,571,771 | Sigman | Oct. 16, 1951 |

FOREIGN PATENTS

| | | |
|---|---|---|
| 439,264 | Great Britain | Dec. 3, 1935 |